Oct. 9, 1945. A. SIMMON ET AL 2,386,575
CAMERA
Filed March 20, 1944 6 Sheets-Sheet 6
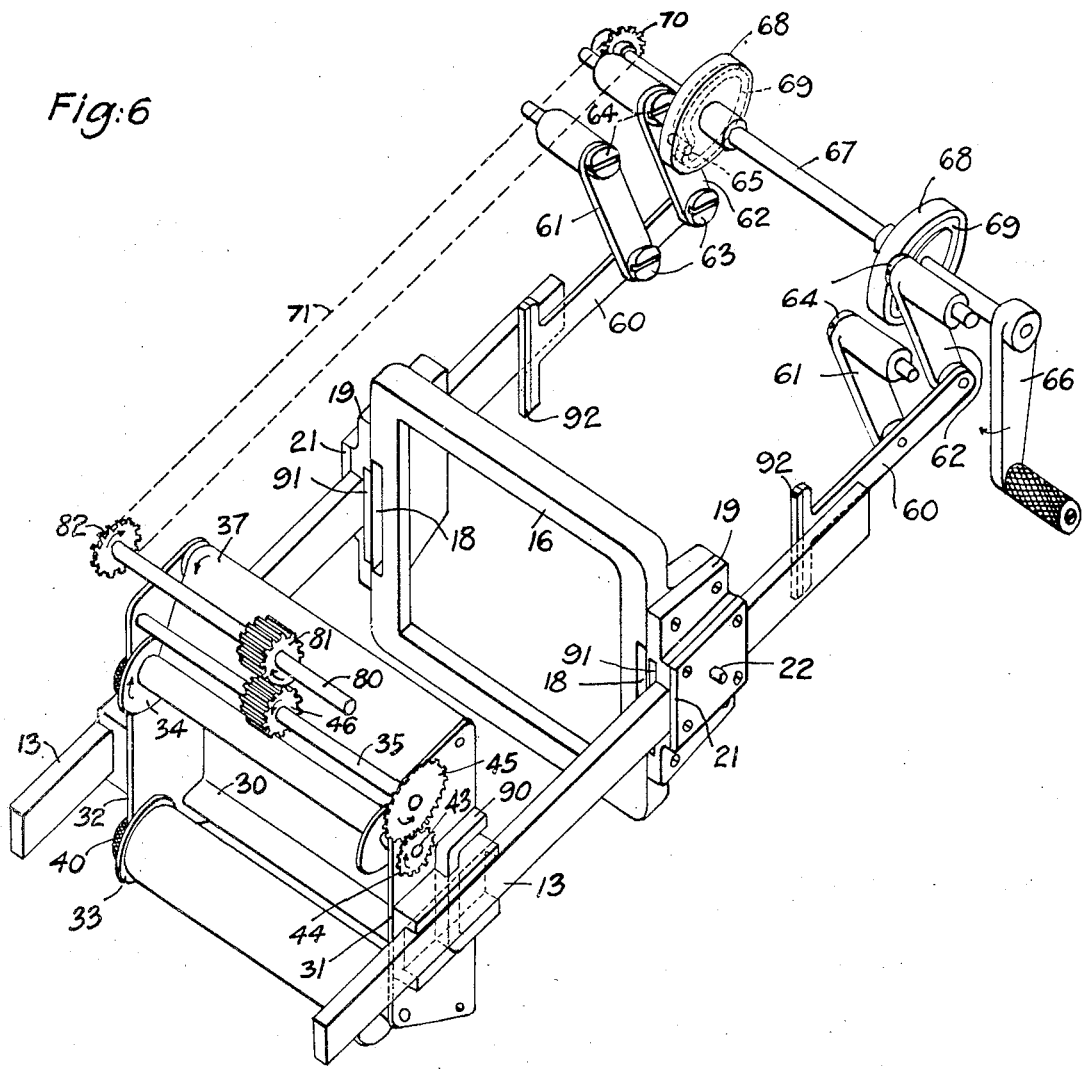
Fig:6
Alfred Simmon
Louis L. Weisglass
INVENTORS
BY Walter E. Wollheim
ATTORNEY.

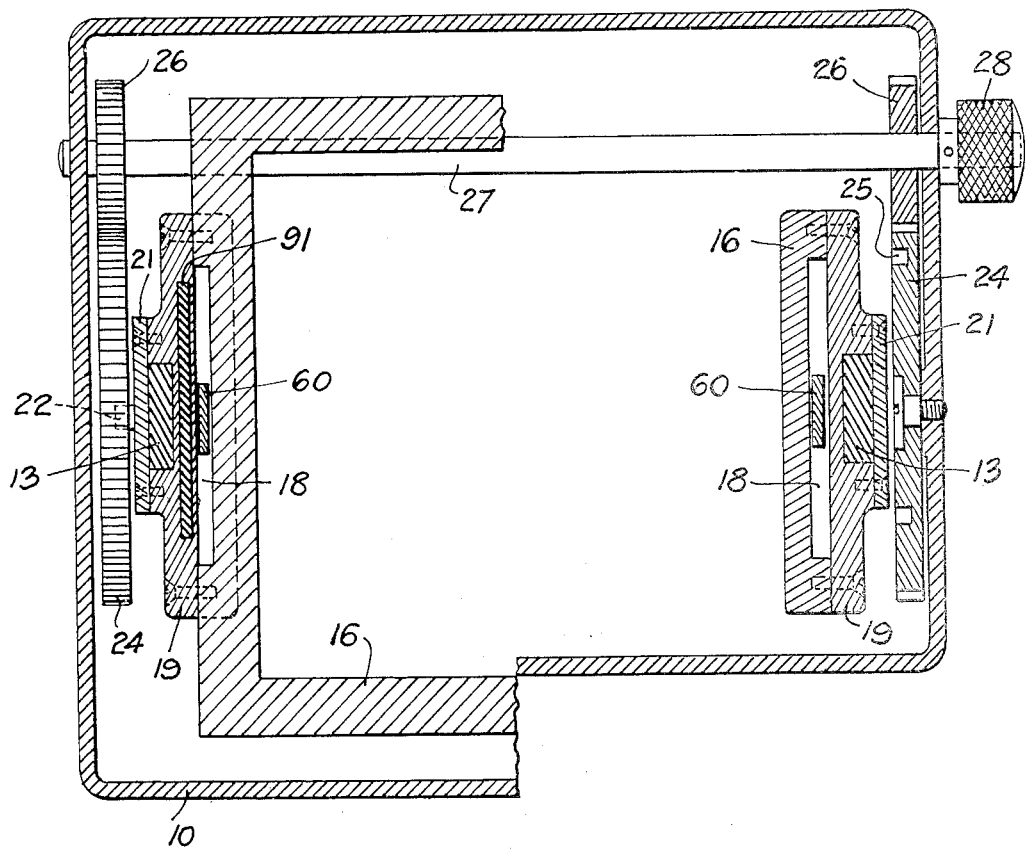

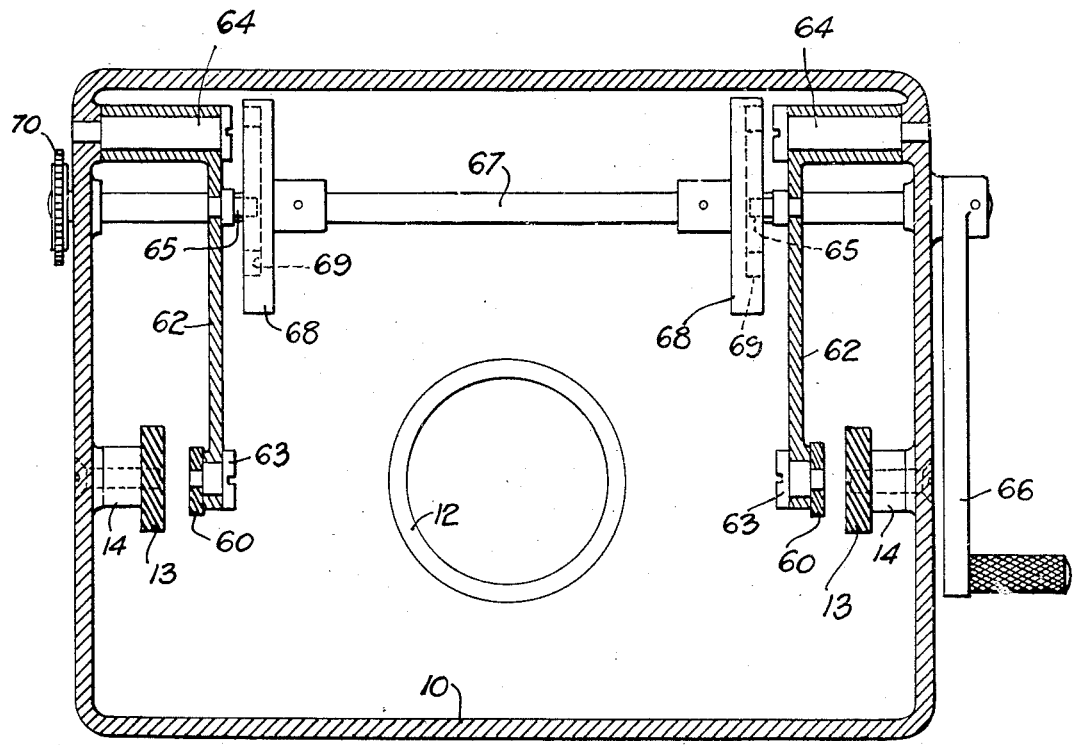

Patented Oct. 9, 1945

2,386,575

UNITED STATES PATENT OFFICE 2,386,575

CAMERA

Alfred Simmon, Jackson Heights, and Louis L. Weisglass, New York, N. Y.; said Weisglass assignor to said Simmon Application March 20, 1944, Serial No. 527,266

15 Claims. (Cl. 95—31)

This invention pertains to photographic cameras.

Almost all cameras have two principal parts, the front part supporting the lens, and the main camera housing supporting the sensitized material on which the picture is being taken. The distance between the two parts can be adjusted by the operator for focusing purposes.

It has been a tendency of modern camera design to incorporate more and more automatic features in order to make the operation of the camera faster, more convenient and more nearly fool-proof. For example, it has become desirable to connect the shutter tensioning means and the film winding means so that the operator can perform both functions simultaneously. It has also become customary to connect a range finder with the focusing movement of the lens so that the operator knows with certainty whether the lens is focused sharply or not. Future cameras may also have built-in exposure meters requiring a computing device by means of which such factors as prevailing light intensity, diaphragm opening, shutter speed, and film sensitivity can be automatically coordinated.

It will be clear that automatic features of this type require numerous mechanical connections and interlocks between parts mounted in the camera front such as a camera lens, its diaphragm and its shutter, and parts mounted in the main camera housing such as the film winding device, the exposure meter and its computing device and the range finder. These mechanical connections tend to become quite involved and complicated since they all must be designed in such a way that they are not affected by the variable distance between camera front and main housing.

It would obviously be a great simplification if it could be rendered unnecessary to adjust the distance between the camera front and the main camera housing, or, in other words, if one rigid camera housing could be used into which all the numerous parts described above could be mounted. It is the particular purpose of this invention to provide a camera having these characteristics.

This is accomplished essentially by the combination of three instrumentalities, all of them mounted within the rigid camera housing. They are: first, an aperture plate within the housing disposed at some suitable distance from the camera lens, this distance being controlled by the operator for focusing purposes; second, a slideable film carrier which supports the film spools and which comprises, as an integral part, a pressure plate backing the film; and third, cam and lever means shifting this film carrier between two alternate positions. In the exposure or forward position the film carrier will be in close contact with the aperture plate, whereas in the film winding or rearward position, the film carrier is out of contact with the aperture plate, but in operative engagement with a film winding drive which is fixedly mounted in some suitable place near the camera back.

We are aware of the fact that the expedient of using a slideable aperture plate within a camera housing is not new, but in the past it was always proposed in connection with film spools which were fixedly mounted within the camera housing. Movement of the aperture plate was made possible simply by leaving enough slack in the film between the film spools so that the flexible film, which was always backed by a spring actuated pressure plate, could follow the movement of the aperture plate. It will be clear that this design is definitely restricted to the smallest type of cameras which are equipped with lenses with very short focal length, and that it is not applicable to larger cameras since there the movement of the aperture plate is much too long to be taken care of simply by slack between the film spools. For example, so-called 35 mm. cameras are equipped with lenses 2" focal length. The movement of the aperture plate between the infinity position and a position focused for 3 ft. amounts to only .117". This distance is quite small and the film can be pressed forward by this amount by a spring actuated pressure plate without difficulty. A larger camera, by way of example, a camera for 4" x 5" negatives, may be equipped with a lens of, for instance, 6½" focal length. Here the difference between the infinity position and the 3 ft. position would amount to 1.430". It is obviously quite out of order to allow for this large movement by providing sufficient slack between the film spools and, consequently, the combination of a slideable aperture plate and film spools, fixedly mounted within the housing, is not applicable to larger cameras. It is the main advantage of our invention that it may be applied to cameras of any size, and that the length of the movement of the aperture plate is no longer in any way restricted, since the film spools are now mounted on a slideable carriage which may follow the movement of the aperture plate without regard to its length of travel.

With reference to the attached drawings,

Fig. 4 is a combination cross sectional view having its left half along the plane of a line 4a—4a in Fig. 1, and its right half along the plane of line 4b—4b in Fig. 1, the two views being shown joined together to make especially clear the correlation of some of the operating parts;

Fig. 5 is a cross sectional view along the plane of line 5—5 in Fig. 1; and

Fig. 6 shows the essential parts of this mechanism in axonometric projection and in which for sake of clearness the camera housing and the focusing drive for the aperture plate have been omitted, and the film carrier has been shown in the film winding position, whereas the cam operated attracting and detracting device is shown in the exposure position.

Like characters of reference denote similar parts throughout the several views and the following specification.

Figure 1:
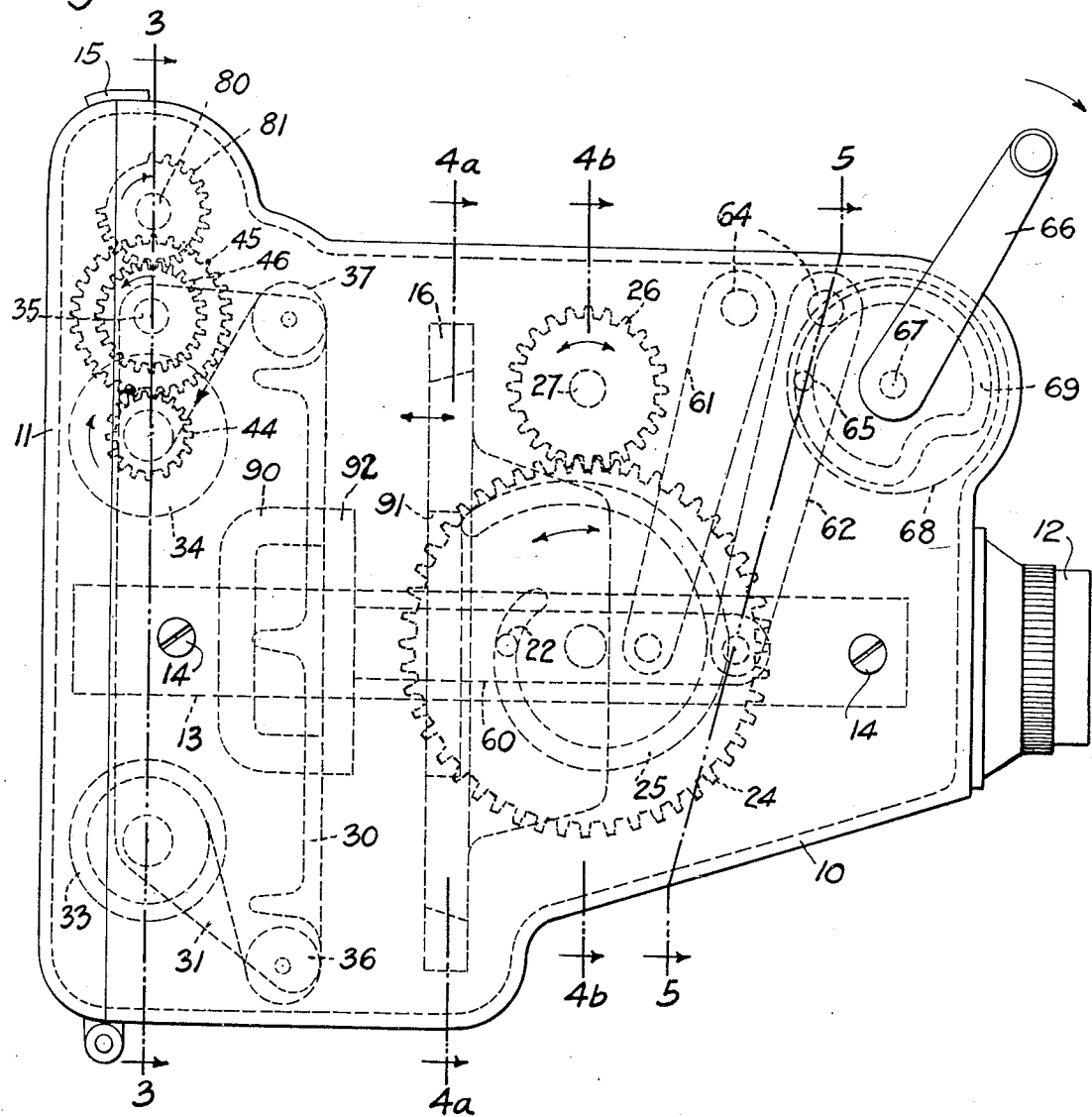
Fig. 1 shows a side view of the complete camera, embodying the principles of this invention, the various parts being shown in the film winding position.

The camera consists essentially of the following subassemblies:

(1) Camera housing,
(2) Movable aperture plate,
(3) Self-locking drive for aperture plate,
(4) Movable film carrier,
(5) Attracting and detracting device for film carrier,
(6) Film winding drive.

We shall describe these sub-assemblies in this sequence.

Camera housing

The camera housing 10 is equipped with a removable camera back 11. These parts are preferably aluminum or magnesium castings, but they may also be constructed from sheet metal, plastics, wood or any other suitable material. The housing 10 supports a lens 12 as well as numerous other parts, such as a shutter, range and view finder and others which are not shown since they do not form part of this invention. Within the housing are mounted two rails 13 which are shown to be of rectangular cross section. This, however, is not essential and any other suitable cross section such as circular or triangular may be chosen if so desired. These rails are fastened to the housing with four screws and suitable spacers 14 which can be seen in Fig. 5. These rails are of importance since they support the slideable aperture plate and the slideable film carrier which shall be described later. The camera back 11 is either hinged to the main housing 10 as shown or is, in other suitable ways, detachable. This is necessary in order to permit the insertion of the film carrier. The camera back is fastened to the main housing by means of a latch or other locking element 15 and the connection between the camera back and main housing must, of course, be light-tight. This can, for example, be accomplished by having a projection run along the dividing line on one of these elements which will engage a correspondingly shaped groove in the other element. These expedients are well known and are, therefore, not shown in detail in the drawings.

Aperture plate

The aperture plate is essentially a rectangular plate which should be accurately machined. In Figs. 4 and 6 the aperture plate 16 can be clearly seen. Slots 18 are provided on both sides, the purpose of which will be explained later. These slots are closed by brackets 19 which have a suitably formed rectangular groove enabling the aperture plate assembly to slide on rails 13. This groove is closed by a cover plate 21 to which a pin 22 is attached. During the exposure the film, as will be apparent, will be pressed against the flat rear surface of this aperture plate. This rear surface is shown to be perfectly flat, but it can be modified to follow the specifications of our co-pending application Serial #521,826 on a Film flattening device. This would have the advantage that the film is kept more nearly flat, but with respect to this present invention the shape of the rear surface of the aperture plate is unimportant.

Self-locking drive for aperture plate

Figure 2:
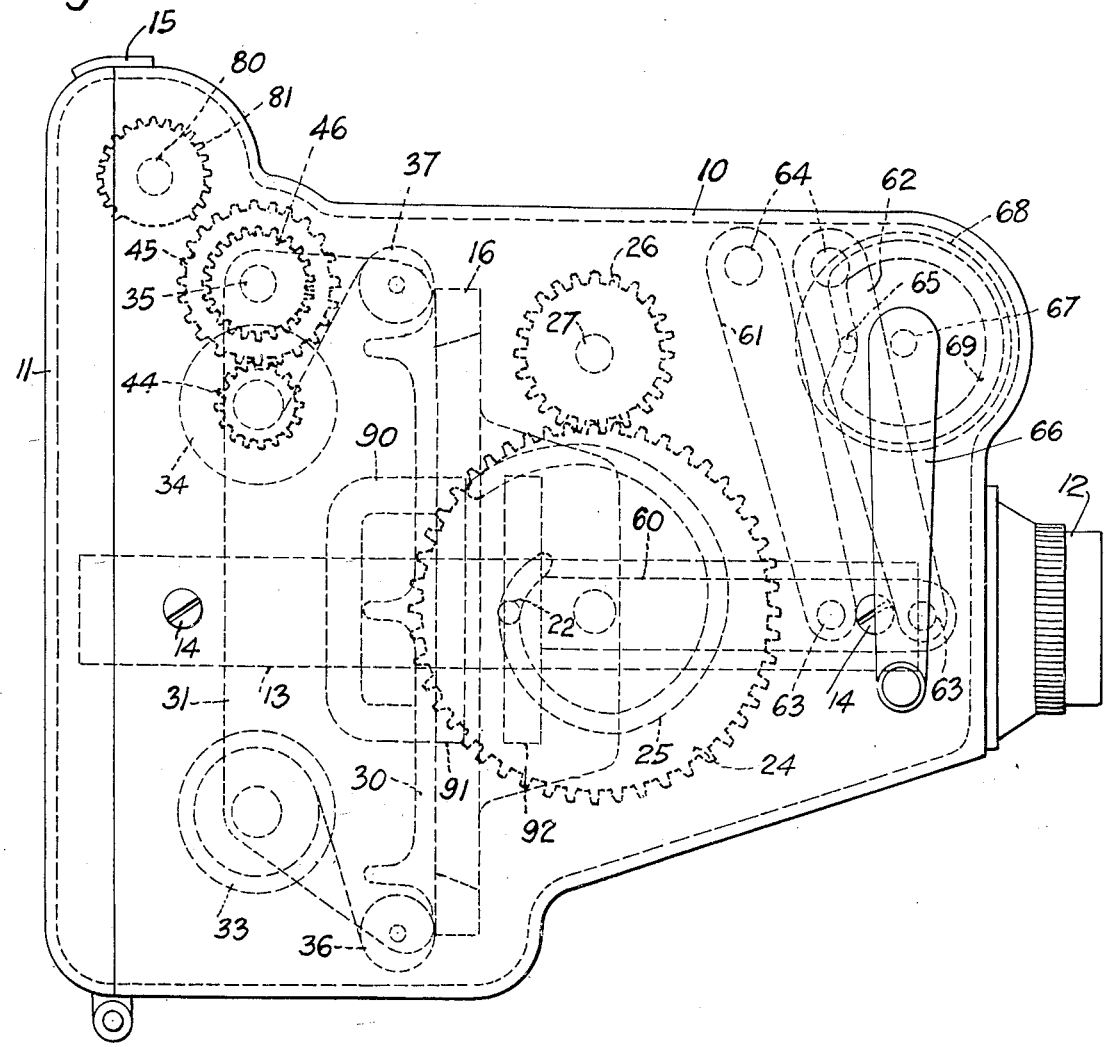
Fig. 2 is a similar view, but the component parts are shown in the exposure position.
Figure 3:
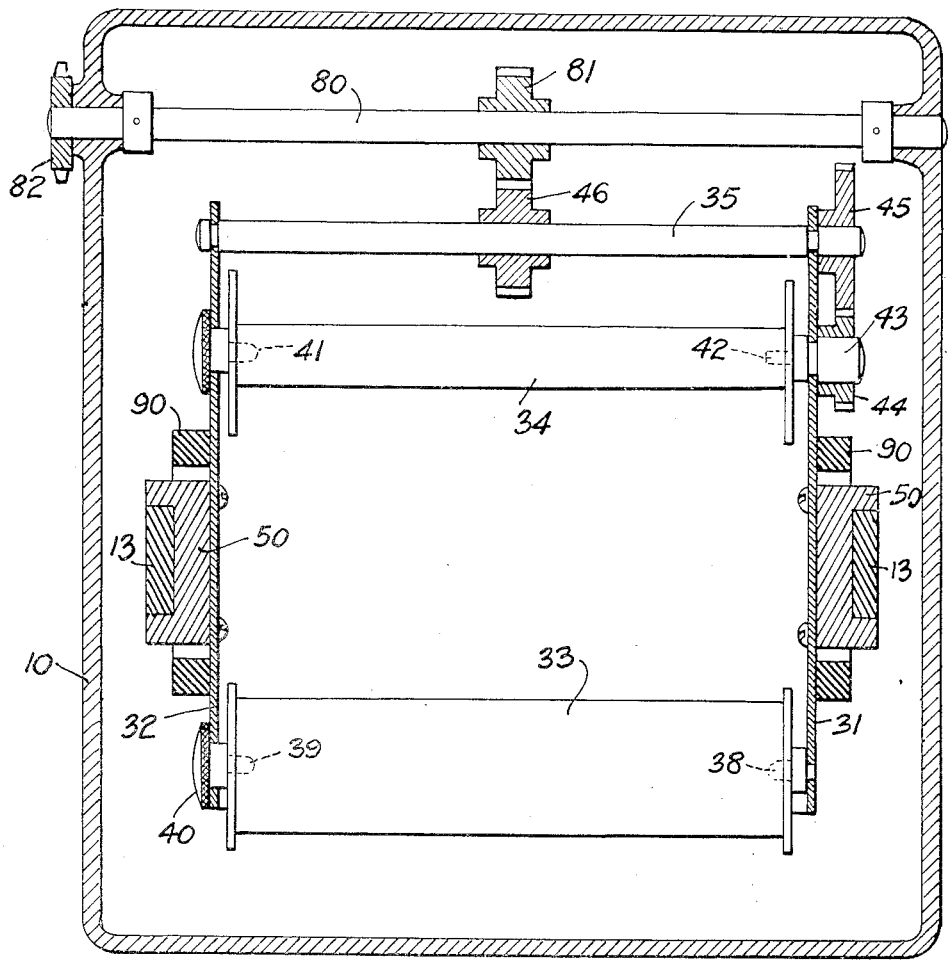
Fig. 3 is a cross sectional view along the plane of line 3—3 in Fig. 1.

As can be seen in Figs. 1 and 2, the aperture plate 16 is disposed at some distance from lens 12. This distance must be adjusted by the operator until a sharp image of the object to be photographed is projected by the lens into the plane of the rear surface of the aperture plate. For reasons which will be explained later, this drive must be self-locking, i. e., the operator shall be in a position to change the distance of the aperture plate from the lens, but no force exerted by other elements within the camera upon the aperture plate shall be able to change its position with respect to the lens. Self-locking movements of this type are well known and, for example, a screw with a sufficiently fine thread will serve the purpose. It will, therefore, be understood that the construction shown is merely a typical example and that other self-locking drives should fall within the scope of this invention.

The focusing drive shown by us consists of two circular discs 24 which are equipped with spiral grooves 25 which engage the pins 22 which were described above, and which are attached to the aperture plate assembly. Gear teeth are cut into the outer periphery of discs 24 which cooperate with two smaller gears 26. These gears 26 are mounted on a common transverse shaft 27, see Fig. 4, which also carries a knurled handwheel 28 by means of which the operator can rotate this shaft and, thereby, discs 24 as well. It will be clear that any rotation of discs 24 will result in a horizontal travel of pin 22 and, therefore, of the aperture plate assembly, either to the right or left, thereby changing the distance of its rear surface from the lens. It is expedient to adjust this movement in such a way that the extreme forward position, in the drawings the extreme position to the right, is the infinity position. For the photography of relatively close objects, the distance from the lens will, of course, be larger and the aperture plate will, therefore, travel to the left.

Slidable film carrier

This film carrier can be seen in Figs. 1, 2, 3 and 6. It comprises a rigid, preferably cast, plate 30 which must be accurately machined and which acts as a pressure plate backing the roll film. This pressure plate is again shown as perfectly flat, but it may also have the shape shown in our co-pending application Serial #521,826 which will hold the film flat with a higher degree of precision. For the purpose of this invention, however, the shape of this pressure plate is unimportant. On either side of this pressure plate are fastened plates 31 and 32 which support the two film spools 33 and 34 as well as the transverse shaft 35. The lower film spool 33 is loaded with unexposed film which, after the exposure, is wound on spool 34. This winding movement is facilitated by two guide rolls 36 and 37. The lower film spool 33 is supported in the customary way by pivots 38 and 39. The latter is equipped with a knurled knob 40 by means of which it can be withdrawn slightly to permit the insertion of the film spool into the carrier. Film spool 34 is supported by a pivot 41 and a film key 42. Pivot 41 is again equipped with a knurled knob and can be withdrawn to facilitate the insertion of film spool 34. The film key 42 is fastened to a short shaft 43 to which the gear 44 is mounted. This gear meshes with a larger gear 45 which is mounted on shaft 35. Another gear 46 is mounted approximately in the center of shaft 35. It is the purpose of this gear to cooperate with the film winding drive which will be described later.

On either side of the film carrier are small brackets 50 which have rectangular grooves engaging the rails 13 which were described above and which are mounted fixedly within the camera housing. By means of these brackets the entire carrier, including the film spools and the gear mechanism, can slide freely on rails 13. During operation it assumes two alternate positions, the film winding position as shown in Fig. 1 during which the film carrier, or more specifically, gear 46 is in operative engagement with a corresponding gear of the film winding drive, and the exposure position shown in Fig. 2 during which the roll film is sandwiched between the rear face of aperture plate 16 and the film carrier, or more specifically, its pressure plate 30.

*Attracting and detracting device for film carrier*

Simple cam and lever means are provided in order to make the film carrier assume these two alternate positions. These cam and lever means can be seen in Figs. 1, 2, 5 and 6. They consist essentially of two push rods 60 which, during operation, perform an essentially linear motion and which assume the position shown in Fig. 1 during the film winding period and the position shown in Figs. 2 and 6 during exposure. Each of these push rods is guided by two parallel levers 61 and 62. These levers which form a parallelogram movement are attached to the push rods by means of pivots or shoulder screws 63 and to the camera housing by means of similar, but longer, pivots or shoulder screws 64. Each lever 62 is equipped with a pin or cam follower 65 by means of which its position can be controlled by the operator.

This is accomplished by a hand crank 66, driving shaft 67 to which two cylindrical wheels 68 are mounted. Each of these wheels 68 is equipped with a cam groove 69 the shape of which can be clearly seen in Figs. 1 and 2 and which engages pin 65. Also mounted on shaft 67 is a sprocket gear 70 which by means of a chain 71 is connected to a corresponding sprocket gear of the film winding drive. As can be clearly seen in Fig. 6 a rotation of wheels 68 with their cam grooves 69 will cause pin 65 and, thereby, lever 62 and 61 and push rods 60 to move forward. As can be seen in Fig. 4 the push rods 60 are so disposed that they may pass through the aforementioned slots 18 of the aperture plate assembly.

It will be clear that in addition to the cam and lever means, just described, some force must be provided to urge the film carrier forward so as to make contact with the two push rods 60 or with the aperture plate 16. The simplest way would, of course, be to back the film carrier by a spring which would always press it forward, i. e., toward the right as seen in Figs. 1 and 2. Springs, however, have a most undesirable property for this application, since the force exerted by them decreases in proportion to their extension. Consequently, the maximum force would be exerted with the film carrier pressed rearwardly as shown in Fig. 1, i. e., in the film winding position, when no force is needed, and a much smaller force would be exerted in the forward or exposure position shown in Fig. 2, just when the maximum force is required for film flattening purposes. Since the aperture plate may move, depending upon the distance for which the camera has been focused, the movement of the film carrier will also vary correspondingly with the further undesirable result that the pressure exerted upon the film in the exposure position is less with the camera focused for far distant objects than with a camera focused for close-ups.

We prefer, therefore, not to use a spring but to use small permanent magnets as suitable means of attraction between the film carrier and the aperture plate. Magnets have characteristics which are most suitable for this application since they exert their maximum force when their armature is in direct contact with them, i. e., in this case in the exposure position when the maximum force is really needed for film flattening purposes. In this particular application, magnetic means of attraction have the further advantage that they act solely between the aperture plate and the film carrier without any reaction between the camera housing and any of these two elements. Consequently, the operator, when focusing, does not have to overcome any additional force, and the ease of focusing is not impaired. With a spring backing the film carrier, the focusing movement in one direction would have to be made against the force of the spring, and in the other direction it would be assisted by the spring, thereby introducing a very undesirable differentiation.

Two small horseshoe magnets 90 have been mounted on either side of the film carrier. These magnets cooperate with two pieces of soft iron 91 which are mounted on brackets 19 of the aperture plate assembly. Two additional pieces of soft iron 92 are mounted on the front face of push rods 60.

The magnets are as wide as the combined width of soft iron pieces 91 and 92 plus some clearance, so that the face of each of the magnets can come in contact with either a soft iron piece 91 or a soft iron piece 92 or even with both pieces at the same time.

The attracting and detracting device is designed in such a way that its stroke is somewhat longer than the longest possible travel of the aperture plate assembly for focusing purposes. The purpose of this arrangement is to make sure that, in the exposure position, push rods 60 with their soft iron pieces 92 are withdrawn sufficiently far to the right, Fig. 2, so that magnets 90 and, therefore, the entire film carrier rests against soft iron pieces 91 and, therefore, the aperture plate assembly. In the film winding position, push rods 60 will press the film carrier as far to the left as possible, as seen in Fig. 1, thereby bringing it into operative engagement with the film drive.

As can be seen in Figs. 1, 2 and 6, cam shaft 67 is disposed near the front wall of the camera housing, and can, therefore, easily be connected to a front shutter, so that the shutter may be retensioned automatically during the film winding period.

Film winding drive

The film winding drive shown in these specifications is of the simplest conceivable type and consists merely of a shaft 80 to which a gear 81 and a sprocket gear 82 are attached. Gear 81 cooperates with gear 46 of the film carrier. Some teeth of the gear 81 have been removed so that it has to describe a certain angle before its teeth begin to mesh with the teeth of gear 46. The consequence of this arrangement is that the operator may turn crank 66 by a corresponding angle before the roll film begins to move. This will give the cam operated attracting and detracting device sufficient time to push the film carrier back into the film winding position where gear 81 can engage gear 46.

This film winding drive is very simple and does not comprise any means to insure uniform spacing of the exposure frames on the roll film. As a matter of fact, since spool 34 becomes larger and larger as more film is being wound on it, the spacing of subsequent exposure frames will become wider and wider. For relatively short roll films and for film spools with a core of relatively large diameter this effect is not too pronounced and a simple film winding drive such as shown may be satisfactory. For longer roll films and for film spools with a small core diameter additional means must, of course, be provided to compensate for the effect of the increasing diameter of film spool 34 so that uniform spacing of subsequent exposure frames on the roll film can be obtained. A suitable device for this purpose has been disclosed in Patent #2,340,624, issued to Alfred Simmon on February 1, 1944. This device or similar ones serving the same purpose may be substituted for the simple gear 81 shown in our drawings.

Operation

The operation of the entire camera can be fully understood from the description of the component parts, but in the interest of clarity, we shall summarize the operation as follows:

Before the operation, the operator opens the camera back 11, withdraws the film carrier and inserts a loaded film spool 33 into the film carrier, leading the film over guide rolls 36 and 37 and fastening the end of the film to the film receiving spool 34. The film carrier is then inserted into the camera so that it can slide freely on rails 13 and the camera back 11 is closed. The film carrier will now assume some position in the rear of the camera, and may or may not be in contact with the aperture plate depending upon how far the operator had it inserted into the camera. For example, the aperture plate may be relatively far towards the right near the infinity position and the operator may have left the film carrier far to the left near the film winding position. The force exerted by magnets decreases very rapidly with distance, and the magnet may in this case not exert enough attraction to bring the film carrier into contact with the aperture plate. The operator now begins to turn crank 66 in a clockwise direction. Crank 66 rotates shaft 67 with the two wheels 68. These wheels are equipped with cam grooves 69. These cam grooves 69 engage pins 65, which are fastened to levers 62 of the attracting and detracting device. Cam grooves 69 have a long circular part and a relatively short inwardly turned cam abutment.

Normally, i. e., at all times except during the film winding period, the crank 66 assumes the position shown in Figs. 2 and 6. Pins 65 rest in the valley of the inwardly turned cam abutment, or as far to the right as possible and, consequently, the entire attracting and detracting device, including push rods 60, assumes the position shown in Figs. 2 and 6, i. e., it it withdrawn far to the right and out of contact with other camera elements. Rotation of crank 66, wheels 68 and cam grooves 69 will, of course, initiate a leftward movement of pins 65, levers 61 and 62, and push rods 60, until pins 65 leave the short cam abutments and enter the long circular parts of cam grooves 69. During this movement, the face of the push rods 62 can pass through slots 18 of the aperture plate assembly so that eventually soft iron pieces 92 come in direct contact with the permanent magnets 90 and from now on the film carrier will follow the forward as well as the return movement of the attracting and detracting device, until it meets, during the return stroke, the aperture plate. As soon as pins 65 enter the long circular part of cam grooves 69 the leftward movement of push rods 60 and, therefore, of the film carrier, stops. The film carrier assumes now the position shown in Figs. 1 and 6, its gear 46 is directly underneath gear 81 of the film winding drive and continued rotation of crank 66, wheels 68 and cam grooves 69 will have no further effect upon its position, as long as pins 65 remain in the long circular parts of cam grooves 69.

The film winding drive is geared to the rotary movement of crank 66, for example, by means of a chain drive as shown in Fig. 6 or by other suitable means. The film winding drive contains at least one incomplete gear 81, i. e., a gear which has certain teeth removed. The angle of this empty space is somewhat larger than the angle occupied by the cam abutment of cam groove 69, and consequently, the film winding drive will not begin to wind the film until pins 65 of the attracting and detracting device have left the cam abutments and are on the long circular parts of cam grooves 69. This means that the film winding drive will not begin to wind the film until the film carrier is in its extreme left position as shown in Fig. 1, i. e., until gear 46 is directly underneath gear 81. Any further movement of crank 66 will not produce any change in the position of push rod 60 and of the film carrier as long as pins 65 slide in the long circular parts of cam grooves 69, but during this time gear 81 will drive gear 46 and will, thereby wind film from spool 33 on to spool 34. Eventually all teeth of gear 81 will have passed the corresponding teeth of gear 46 and the film winding movement will stop. Slightly later, pins 65 will leave the circular parts of the cam grooves 69 and will enter the short inwardly bent cam abutments. This forces levers 62 and 61 and push rods 60 to move to the right. Since the magnets 90 have been in contact with soft iron pieces 92 the film carrier will follow this movement until magnets 90 come in contact with soft iron pieces 91 which are mounted on the aperture plate assembly. At the same time, of course, the entire front face of the film carrier comes also in contact with the rear face of the aperture plate assembly, and that part of the roll film on which the picture is being taken is now firmly sandwiched between the aperture plate 16 and the pressure plate 30 of the film carrier. Push rods 69 have not yet completed their stroke since the depth of the cam abutments of the cam grooves 68 is so large that the stroke of push rods 60 is always longer than the distance between the film carrier in its extreme left or film winding position and the aperture plate assembly even in its farthest right or infinity position. The attracting and detracting device will, therefore, continue its travel and eventually assume the position shown in Figs. 2 or 6, i. e., be entirely out of contact with the film carrier, and the film carrier will be merely magnetically attached to the aperture plate assembly. This is the exposure position which is shown in Fig. 2. During this position the film carrier and the aperture plate assembly form a common unit which can be shifted freely for focusing purposes by means of the two spiral grooves 25 of wheels 24 of the self-locking focusing drive.

After the exposure has been taken the operator turns crank 66 again, thereby starting again a substantially linear movement of push rods 60 toward the left. Push rods 60 penetrate slots 18 of the aperture plate assembly coming in contact with the front face of the film carrier. Further rotation of the crank 60 forces the push rods further to the left, thereby overcoming the attraction of magnets 90 to soft iron pieces 91 and forcing the entire film carrier back into the film winding position as shown in Fig. 1.

It will now be clear why the focusing drive, as described above, had to be self-locking so that no external force can change its position with respect to the camera housing and, of course, the lens. Without this self-locking feature the aperture plate would be forced out of whatever position it happens to assume, both during the forward as well as during the back stroke of the attracting and detracting device. During the forward stroke, towards the left in Figs. 1 and 2, push rods 60 force the film carrier to the left, and since the aperture plate is attracted to the film carrier by magnets, it would have the tendency to follow the film carrier on its rearward travel. Similarly during the back stroke, the film carrier follows the push rods on their travel toward the right, being magnetically attracted to them and would, therefore, have the tendency to push the aperture plate towards the right during the later part of its forward travel. Since the focusing drive for the aperture plate is self-locking, no external force can change its position and, therefore, the cam drive of the attracting and detracting device will overcome the magnetic attraction between push rods and film carrier on its backward stroke and between film carrier and aperture plate on its forward stroke, and in this manner make the film carrier assume a rearward position as shown in Fig. 1 for film winding purposes and a forward position for the exposure as shown in Fig. 2, without affecting the position of the aperture plate, which remains in whatever position the operator has focused it.

It will be clear that details of the camera just described may be widely modified. For example, the film spools 33 and 34 do not necessarily have to be mounted in the rear of the pressure plate 30 but one film spool may be mounted above and one film spool below this pressure plate, thereby dispensing with film guide rollers 36 and 37. This would increase the height of the camera but considerably decrease its depth. Similarly, while both the film carrier and the aperture plate are shown as sliding on the same pair of rails 13, separate rails may be provided for either element or may even be entirely dispensed with in favor of some suitable linkage system. The film winding drive can, of course, be widely modified, and this has already been mentioned. The same is true for the focusing drive and also for the cam operated attracting and detracting device and in all these cases numerous possible modifications will immediately occur to anybody skilled in the art. For instance, while the sprocket wheels 70 and 82 and the connecting chain 71 are shown exposed exteriorly of the camera housing 10, it is obvious that the same can be covered with a sub-housing, or placed within the housing 10, if so desired. Modifications of this character should be understood to fall within the scope of this invention.

Many other changes may be found expedient and still fall within the claims.

What we claim as new is:

1. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, and a cam follower engaging said groove, the relation between the cam abutment and said portion of said gear being such that the abutment has passed the cam follower before the teeth of said incomplete gear have come in contact with the teeth of a complete cooperating gear of said train.

2. In a film camera, the combination within a rigid camera housing, of a movable aperture plate and a movable film carrier including a pair of film spools, a complete gear operating in unison with one of said spools, a film winding drive in cooperation with said carrier, rotatably supported within the housing and including at least one incomplete gear in which a portion of its teeth has been removed adapted to engage said before mentioned complete gear, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, and a cam follower engaging said groove, the relation between the cam abutment and said portion of said gear being such that the abutment has passed the cam follower before the teeth of said incomplete gear have come in contact with the teeth of said complete gear.

3. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, and the travel of said carrier being longer than the travel of said plate, and a cam follower engaging said groove, the relation between the cam abutment and said portion of said gear being such that the abutment has passed the cam follower before the teeth of said incomplete gear have come in contact with the teeth of a complete cooperating gear of said train.

4. In a film camera, the combination within a rigid camera housing, of a movable aperture plate and a movable film carrier including film spools, a film winding drive in cooperation with said carrier including a train of gears and at least one incomplete gear in which a portion of its teeth has been removed, self-locking means operable from the exterior of said housing to shift said plate for focusing purposes comprising a cam disc having a groove, means on said plate engaging said groove, and a drive for said cam disc, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, and a cam follower engaging said groove, the relation between the cam abutment and said portion of said gear being such that the abutment has passed the cam follower before the teeth of said incomplete gear have come in contact with the teeth of a complete cooperating gear of said train.

5. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, and means connecting said film winding drive with said cam means for simultaneous operation, the relation between the cam abutment and said portion of said gear being such that the abutment has passed the cam follower before the teeth of said incomplete gear have come in contact with the teeth of a complete cooperating gear of said train.

6. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, and means connecting said film winding drive with said cam means for simultaneous operation comprising a sprocket wheel forming part of said drive and a sprocket wheel forming part of said cam means, and a chain connecting said sprocket wheels, the relation between the cam abutment and said portion of said gear being such that the abutment has passed the cam follower before the teeth of said incomplete gear have come in contact with the teeth of a complete cooperating gear of said train.

7. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, and means connecting said film winding drive with said cam means for simultaneous operation, the travel of said carrier being longer than the travel of said plate, the relation between the cam abutment and said portion of said gear being such that the abutment has passed the cam follower before the teeth of said incomplete gear have come in contact with the teeth of a complete cooperating gear of said train.

8. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes comprising a cam disc having a groove, means on said plate engaging said groove, and a drive for said cam disc, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, and means connecting said film winding drive with said cam means for simultaneous operation, the relation between the cam abutment and said portion of said gear being such that the abutment has passed the cam follower before the teeth of said incomplete gear have come in contact with the teeth of a complete cooperating gear of said train.

9. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, means connecting said film winding drive with said cam means for simultaneous operation, and means of attraction between, respectively, said carrier and plate, and said carrier and cam means, the relation between the cam abutment and said portion of said gear being such that the abutment has passed the cam follower before the teeth of said incomplete gear have come in contact with the teeth of a complete cooperating gear of said train.

10. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, means connecting said film winding drive with said cam means for simultaneous operation, and means of attraction between, respectively, said carrier and plate, and said carrier and cam means, said means of attraction including at least one permanent magnet, the relation between the cam abutment and said portion of said gear being such that the abutment has passed the cam follower before the teeth of said incomplete gear have come in contact with the teeth of a complete cooperating gear of said train.

11. In a film camera, the combination within a rigid camera housing, of a movable aperture plate and a movable film carrier including film spools, a film winding drive in cooperation with said carrier including a train of gears and at least one incomplete gear in which a portion of its teeth has been removed, means operable from the exterior of said housing to shift said plate for focusing purposes, cam means operable from the exterior of said housing to shift said carrier, said cam means comprising at least one wheel with a groove having a relatively long circular part and a relatively short angular cam abutment, the radial angle of said abutment being smaller than the radial angle of that portion of said gear in which the teeth have been removed, a cam follower engaging said groove, means connecting said film winding drive with said cam means for simultaneous operation, and means of attraction between, respectively, said carrier and plate, and said carrier and cam means, said means of attraction comprising at least one permanent magnet, said cam means and said means of attraction adapted to cooperate to shift said carrier in one direction to bring the carrier into operative engagement with said film winding drive during the film winding period, and in opposite direction to bring the carrier into contact with said plate during exposure, the relation between the cam abutment and said portion of said gear being such that the abutment has passed the cam follower before the teeth of said incomplete gear have come in contact with the teeth of a complete cooperating gear of said train.

12. In a film camera, a rigid housing, a lens mounted on the front wall of said housing, film winding means mounted near the rear wall of said housing at a fixed distance from said lens, a movable aperture plate within said housing, means operable from the exterior of the camera to move said aperture plate for focusing purposes, a movable film carrier within said housing including a substantially flat film backing plate, a rotatable film storage spool and a rotatable take-up spool, and means operable from the exterior of the camera, and independent of said aperture plate moving means, to shift said film carrier into a forward position for an exposure and into a rearward position for film winding, in the forward position the film being sandwiched between said substantially flat film backing plate and said aperture plate and the rotatable take-up spool being out of operative engagement with said film winding means, and in the rearward position the film being out of contact with said aperture plate and the rotatable take-up spool being in operative engagement with said film winding means.

13. In a film camera, a rigid housing, a lens mounted on the front wall of said housing, film winding means mounted near the rear wall of said housing at a fixed distance from said lens, a movable aperture plate within said housing, means operable from the exterior of the camera to move said aperture plate for focusing purposes, a movable film carrier within said housing including a substantially flat film backing plate, a rotatable film storage spool and a rotatable take-up spool, means operable from the exterior of the camera, and independent of said aperture plate moving means, to shift said film carrier into a forward position for an exposure and into a rearward position for film winding, in the forward position the film being sandwiched between said substantially flat film backing plate and said aperture plate and the rotatable take-up spool being out of operative engagement with said film winding means, in the rearward position the film being out of contact with said aperture plate and the rotatable take-up spool being in operative engagement with said film winding means, and means to synchronize the action of said film winding means and said film carrier shifting means, the action of said film winding means commencing after the film carrier has been shifted into its rearward position and said action being completed before said film carrier is being shifted back into its forward position.

14. In a film camera, a rigid housing, a lens mounted on the front wall of said housing, film winding means mounted near the rear wall of said housing at a fixed distance from said lens, a movable aperture plate within said housing, means operable from the exterior of the camera to move said aperture plate for focusing purposes, a movable film carrier within said housing including a substantially flat film backing plate, a rotatable film storage spool and a rotatable take-up spool, and means operable from the exterior of the camera, and independent of said aperture plate moving means, to shift said film carrier into a forward position for an exposure and into a rearward position for film winding, in the forward position the film being sandwiched between said substantially flat film backing plate and said aperture plate and the rotatable take-up spool being out of operative engagement with said film winding means, in the rearward position the film being out of contact with said aperture plate and the rotatable take-up spool being in operative engagement with said film winding means, said means to move said aperture plate for focusing purposes being self-locking to prevent said aperture plate from being shifted accidentally when coming in contact with said movable film carrier.

15. In a film camera, a rigid housing, a lens mounted on the front wall of said housing, film winding means mounted near the rear wall of said housing at a fixed distance from said lens, a movable aperture plate within said housing, means operable from the exterior of the camera to move said aperture plate for focusing purposes, a movable film carrier within said housing including a substantially flat film backing plate, a rotatable film storage spool and a rotatable take-up spool, means operable from the exterior of the camera, and independent of said aperture plate moving means, to shift said film carrier into a forward position for an exposure and into a rearward position for film winding, in the forward position the film being sandwiched between said substantially flat film backing plate and said aperture plate and the rotatable take-up spool being out of operative engagement with said film winding means, in the rearward position the film being out of contact with said aperture plate and the rotatable take-up spool being in operative engagement with said film winding means, and means to synchronize the action of said film winding means and said film carrier shifting means, the action of said film winding means commencing after the film carrier has been shifted into its rearward position and said action being completed before said film carrier is being shifted back into its forward position, said means to move said aperture plate for focusing purposes being self-locking to prevent said aperture plate from being shifted accidentally when coming in contact with said movable film carrier.

ALFRED SIMMON.
LOUIS L. WEISGLASS.